(12) United States Patent
Koganezawa

(10) Patent No.: US 8,848,135 B2
(45) Date of Patent: Sep. 30, 2014

(54) LIQUID CRYSTAL DISPLAY DEVICE

(75) Inventor: Nobuyuki Koganezawa, Chiba (JP)

(73) Assignee: Japan Display Inc., Tokyo (JP)

( * ) Notice: Subject to any disclaimer, the term of this patent is extended or adjusted under 35 U.S.C. 154(b) by 107 days.

(21) Appl. No.: 13/407,826

(22) Filed: Feb. 29, 2012

(65) Prior Publication Data

US 2012/0224122 A1    Sep. 6, 2012

(30) Foreign Application Priority Data

Mar. 3, 2011    (JP) ................. 2011-046700

(51) Int. Cl.
| | | |
|---|---|---|
| G02F 1/1335 | (2006.01) | |
| G02F 1/1333 | (2006.01) | |
| H04N 3/14 | (2006.01) | |
| G09F 13/04 | (2006.01) | |
| F21V 7/04 | (2006.01) | |
| F21V 8/00 | (2006.01) | |

(52) U.S. Cl.
CPC ........ *G02F 1/133603* (2013.01); *G02B 6/0016* (2013.01); *G02B 6/0068* (2013.01); *G02F 2201/56* (2013.01); *G02B 6/002* (2013.01); *G02F 1/133611* (2013.01)
USPC ............. 349/65; 349/58; 348/790; 362/97.2; 362/610; 362/615

(58) Field of Classification Search
None
See application file for complete search history.

(56) References Cited

U.S. PATENT DOCUMENTS

| 6,504,596 | B1 * | 1/2003 | You et al. ................ 349/187 |
| 7,223,010 | B2 * | 5/2007 | Min et al. ................ 362/628 |
| 7,771,108 | B2 * | 8/2010 | Iwasaki .................. 362/634 |
| 2008/0049445 | A1 * | 2/2008 | Harbers et al. ............ 362/612 |
| 2009/0080216 | A1 * | 3/2009 | Tanabe ..................... 362/612 |
| 2009/0279020 | A1 * | 11/2009 | Tanabe ..................... 349/65 |
| 2010/0002169 | A1 * | 1/2010 | Kuramitsu et al. ......... 349/65 |
| 2010/0156945 | A1 | 6/2010 | Yoshida | |

FOREIGN PATENT DOCUMENTS

WO    WO 2008/062575 A1    5/2008

OTHER PUBLICATIONS

Macmillan Dictionary, online version, definition of "obtuse angle." Definition obtained on Aug. 1, 2013.*

* cited by examiner

*Primary Examiner* — Bumsuk Won
*Assistant Examiner* — Angela Davison
(74) *Attorney, Agent, or Firm* — Antonelli, Terry, Stout & Kraus, LLP.

(57) ABSTRACT

The liquid crystal display device has a liquid crystal display panel, a backlight for illuminating the liquid crystal display panel where the outer shape of the backlight in a plane has at least one corner of which the angle is greater than 90°, and a light guide plate LG having approximately the same form as the outer shape of the backlight, wherein a number of light emitting diodes are aligned along two sides (s1, s3) of the light guide plate LG that form a corner A of which the angle is greater than 90°, and the main light for illumination (L2 to L4, L6 and L7) from the light emitting diodes aligned along the two sides propagates through the light guide plate LG in the same direction.

3 Claims, 3 Drawing Sheets

US 8,848,135 B2

LIQUID CRYSTAL DISPLAY DEVICE

CROSS-REFERENCE TO RELATED APPLICATION

The present application claims priority over Japanese application JP 2011-046700 filed on Mar. 3, 2011, the contents of which are hereby incorporated into this application by reference.

BACKGROUND OF THE INVENTION (1) Field of the Invention

The present invention relates to a liquid crystal display device, and in particular, to a liquid crystal display device where the outer shape in a plane of the backlight for illuminating the liquid crystal display panel has at least one corner of which the angle is greater than 90°.

(2) Description of the Related Art

Though conventional liquid crystal display devices generally use a liquid crystal display panel in rectangular form, liquid crystal display devices in irregular form, where the outer shape of the liquid crystal display panel in a plane has an angle that is not 90°, have recently been demanded for large-scale monitors, display devices for amusement, display devices for industrial machinery and liquid crystal display devices mounted in cars.

WO 2008/062575A1 is a prior art document showing an example of a liquid crystal display device in irregular form. In such a liquid crystal display device in irregular form, the backlight for illuminating the liquid crystal display panel is also not rectangular so as to match the form of the liquid crystal display panel. There are also cases where the backlight is not rectangular even if the liquid crystal display panel is rectangular.

When the backlight is not rectangular, particularly when the outer shape of the backlight in a plane has a corner of which the angle is greater than 90°, as shown in FIG. 1, the light guide plate LG also has a corner A of which the angle θ is greater than 90° so as to match the outer shape of the backlight, and in addition, light emitting diodes LED are aligned along the two sides (s1, s2) that form the corner. In this structure, the regions B and C, shown by the dotted lines, become regions of low brightness.

This is because, as shown in FIG. 2, which is a diagram showing an enlargement of the portion in the vicinity of the corner A in FIG. 1, light emitting diodes LED are aligned along the outer shape of the light guide plate LG where the main components M1 and M2 of the light for illumination emitted from the light emitting diodes LED are in such a direction as to progress perpendicularly to the sides (s1 and s2) of the light guide plate LG in the structure.

Because the light for illumination emitted from the light emitting diodes LED slightly radiates and the form on the sides of the light guide plate LG through which the light enters makes the light spread, the light for illumination that has entered into the light guide plate LG tends to spread and radiate as shown in FIG. 2, and in particular, the main component of the light for illumination propagates in the directions perpendicular to the sides (s1 and s2).

Therefore, as shown in FIG. 1, the light for illumination from the light emitting diodes aligned along the upper side s1 propagates in the downward direction in the diagram (L2 to L4), while the light for illumination from the light emitting diodes aligned along the side s2 propagates through the light guide plate LG in the diagonally inward direction (L1 and L5). As a result, most of the light for illumination is directed towards the center portion of the screen inside the light guide plate LG, and thus, the corner portions of the screen, particularly the dotted line regions B and C, receive a small amount of light for illumination, thereby becoming regions of low brightness.

SUMMARY OF THE INVENTION

An object of the present invention is to solve the above-described problem and to provide a liquid crystal display device where it is possible to make the distribution of the brightness of the backlight uniform, even in the case where the outer shape of the backlight in a plane has a corner of which the angle is greater than 90°.

In order to achieve the above-described object, the liquid crystal display device according to the present invention has the following technical features.

(1) A liquid crystal display device, having a liquid crystal display panel and a backlight for illuminating the liquid crystal display panel where an outer shape of the backlight in a plane has at least one corner of which an angle is greater than 90°, is characterized in that the liquid crystal display device has a light guide plate having approximately the same form as the outer shape of the above-described backlight, a number of light emitting diodes are aligned along two sides of the light guide plate that form a corner of which an angle is greater than 90°, and the main light for illumination from the light emitting diodes aligned along the above-described two sides propagates through the light guide plate in a same direction.

(2) The liquid crystal display device according to the above (1) is characterized in that all of the light emitting diodes aligned along the above-described two sides emit light in the same direction, and an outer shape of the light guide plate along one of the above-described two sides is linear and an outer shape along the other side is in a step form.

(3) The liquid crystal display device according to the above (1) is characterized in that the light emitting diodes aligned along the above-described two sides allow light emitted from the light emitting diodes to be perpendicular to the above-described two sides, and a deflection means for changing the direction of the light emitted from the light emitting diodes is provided between the light guide plate and the light emitting diodes along one of the above-described two sides of the light guide plate.

(4) A liquid crystal display device, having a liquid crystal display panel and a backlight for illuminating the liquid crystal display panel where an outer shape of the backlight in a plane has at least one corner of which an angle is greater than 90°, is characterized in that the liquid crystal display device has a light guide plate having approximately the same form as the outer shape of the above-described backlight, a number of light emitting diodes are aligned along a first side of the light guide plate, the first side and a second side forming a corner of which an angle is greater than 90°, a number of light emitting diodes are aligned along a third side that faces and is parallel to the first side and are in such a location as to face the second side, and the main light for illumination from the light emitting diodes aligned along the above-described first and third sides propagates through the light guide plate in directions opposite to each other.

(5) The liquid crystal display device according to any of the above (1) to (4) is characterized in that the angle that is greater than 90° in the above-described corner of the outer shape of the above-described backlight in a plane is 100° or more and 150° or less.

(6) The liquid crystal display device according to any of the above (1) to (5) is characterized in that the angle that is greater than 90° in the above-described corner of the light guide plate is 100° or more and 150° or less.

(7) The liquid crystal display device according to any of the above (1) to (6) is characterized in that the above-described liquid crystal display panel has at least one corner of which the angle is greater than 90°.

In the liquid crystal display device according to the present invention, a number of light emitting diodes are aligned along the two sides of the light guide plate within the backlight that form a corner of which the angle is greater than 90° so that light for illumination from the light emitting diodes aligned along the above-described two sides mainly propagates through the light guide plate in the same direction in the structure, and therefore, the light for illumination that propagates through the light guide plate reaches to the corners of the screen without concentrating in the center portion of the screen, and thus, it is possible to provide uniform illumination throughout the screen.

In addition, a number of light emitting diodes are aligned along a first side of the light guide plate within the backlight, where the first side forms a corner of which the angle is greater than 90° with a second side, and a number of light emitting diodes are aligned along a third side that faces and is parallel to the above-described first side in such a position as to face the second side so that light for illumination from the light emitting diodes aligned along the above-described first and third sides mainly propagates through the light guide plate in the directions opposite to each other, and therefore, the light for illumination that propagates through the light guide plate reaches to the corners of the screen without concentrating in the center portion of the screen, and thus, it is possible to provide uniform illumination throughout the screen.

DESCRIPTION OF THE EMBODIMENT

In the following, the liquid crystal display device according to the present invention is described in detail.

Figure 3:
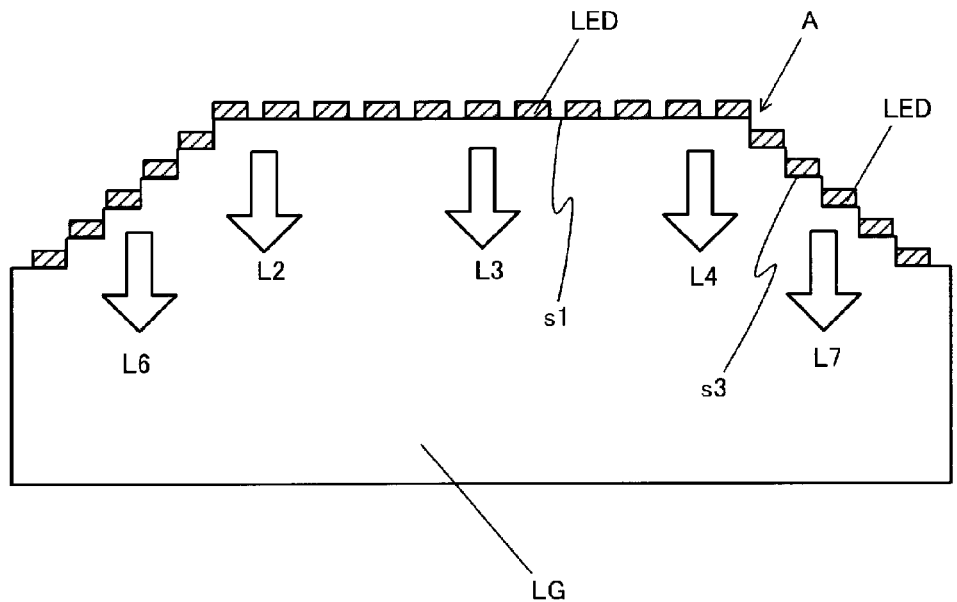
FIG. 3 is a diagram for illustrating the liquid crystal display device according to the first embodiment of the present invention.

As shown in FIG. 3, the present invention provides a liquid crystal display device having a liquid crystal display panel and a backlight for illuminating the liquid crystal display panel where the outer shape of the backlight in a plane has at least one corner of which the angle is greater than 90°, which is characterized in that the liquid crystal display device has a light guide plate LG having approximately the same form as the outer shape of the above-described backlight, wherein a number of light emitting diodes are aligned along two sides (s1, s3) of the light guide plate LG that form a corner A of which the angle is greater than 90°, and the main light for illumination (L2 to L4, L6 and L7) from the light emitting diodes aligned along the above-described two sides propagates through the light guide plate LG in the same direction.

In the present invention, "approximately the same form" means the form that is not necessarily exactly the same, such that the light guide plate of which the form is slightly different from the outer shape of the backlight due to the convenience for the arrangements of the mold for the backlight and the light emitting diodes is acceptable. The above-described "same direction" and the below-described "directions opposite to each other" are not necessarily limited to the case where light propagates completely in the same direction or in the directions opposite to each other, but they mean that a slight difference in the directions can be acceptable as long as the distribution of the brightness within the screen allows for practical use.

In the first embodiment of the present invention, as shown in FIG. 3, light emitting diodes LED are aligned along the two sides (s1, s3) of the light guide plate LG of the backlight so that the light emitting diodes all emit light in the same direction (L2 to L4, L6 and L7), where the outer shape of the light guide plate is linear along one side s1 of the above-described two sides of the light guide plate and the outer shape is in step form along the other side s3.

Figure 1:
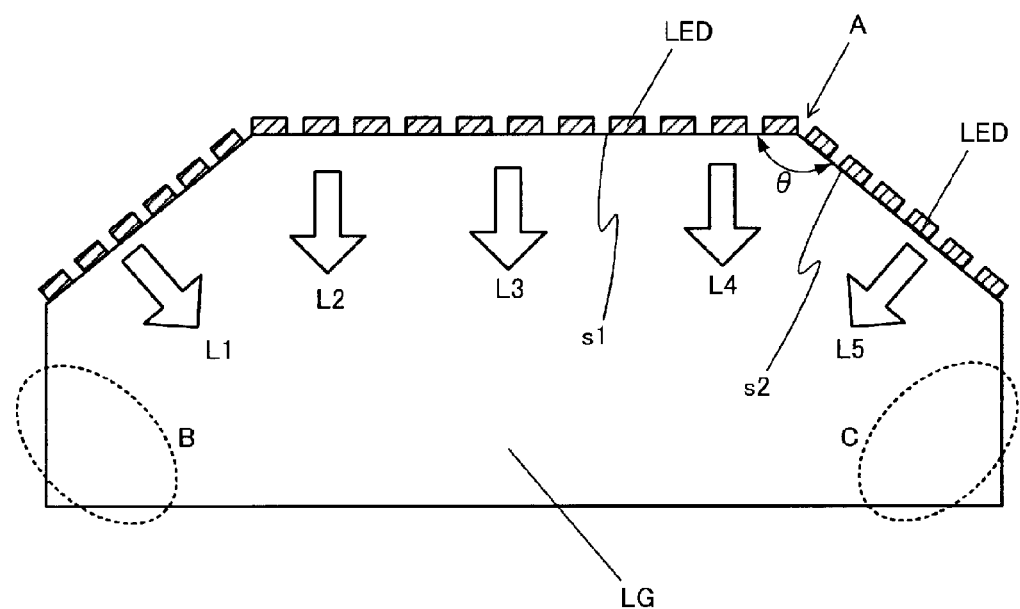
FIG. 1 is a diagram for illustrating the positional relationships between the light guide plate and light emitting diodes in a conventional backlight in irregular form.
Figure 2:
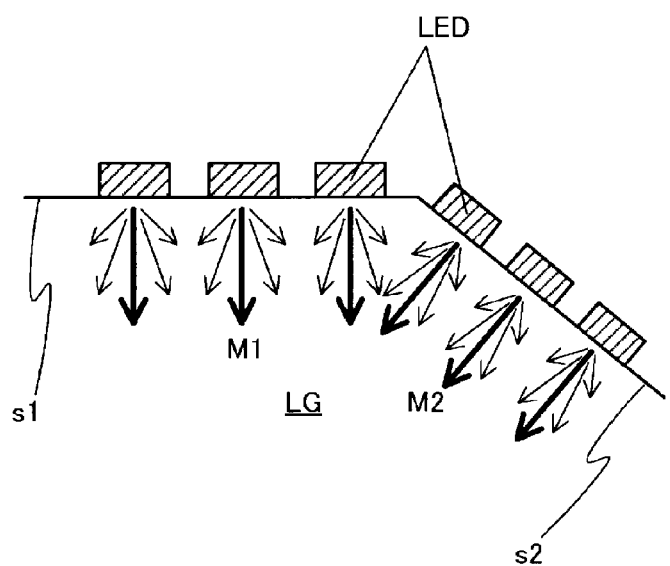
FIG. 2 is a diagram showing an enlargement of the corner portion A in FIG. 1.

The shape of the light guide plate is in step form along the side s3, and therefore, the light emitting diodes LED can be provided along each step so that the direction of light for illumination from all of the light emitting diodes LED provided along the side can be made uniform downwards in the figure (the same direction as light for illumination L2 to L4). Therefore, it is possible to prevent a region of low brightness from being created in the corners of the screen, unlike in FIG. 1.

Figure 4:
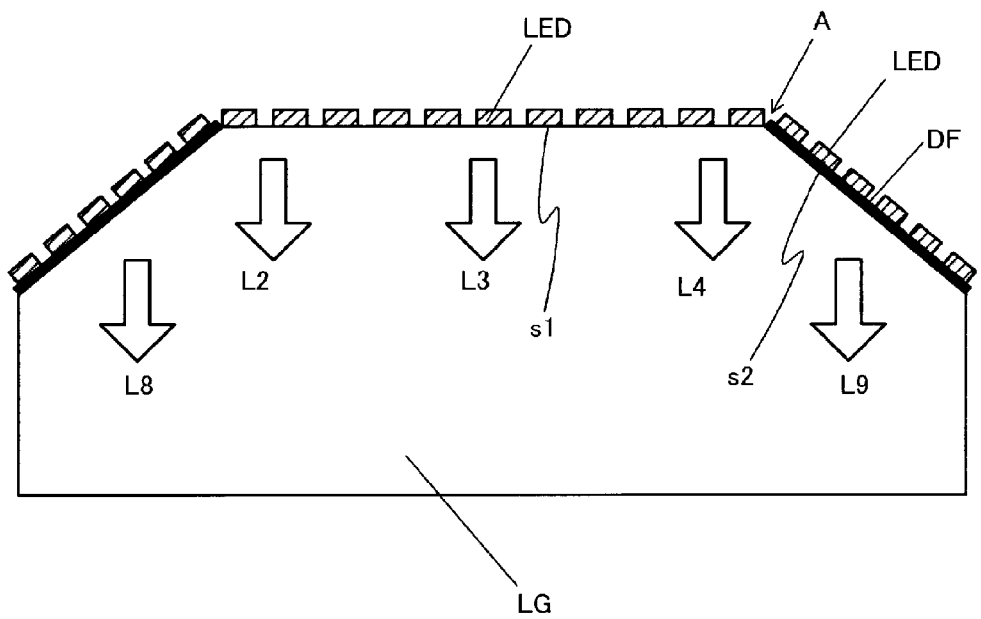
FIG. 4 is a diagram for illustrating the liquid crystal display device according to the second embodiment of the present invention.

In the second embodiment of the present invention, as shown in FIG. 4, light emitting diodes LED are aligned along two sides (s1, s2) of the light guide plate LG of the backlight in such a manner that the light emitting diodes emit light in the direction perpendicular to the above-described two sides (s1, s2), and a deflection means DF for changing the direction in which the light emitting diodes emit light is provided between the light guide plate LG and the light emitting diodes LED along one side s2 of the above-described two sides of the light guide plate.

Figure 5:
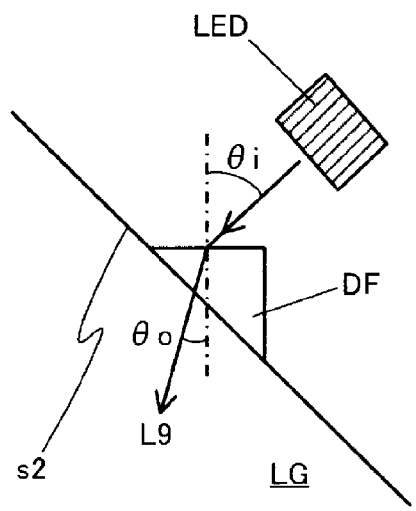
FIG. 5 is a diagram for illustrating an example of the structure of the deflection means in FIG. 4.

An example of the deflection means DF is shown in FIG. 5, where a light emitting diode LED for emitting light for illumination in the direction approximately perpendicular to the side s2 are provided along the side s2 of the light guide plate LG. A refractive member DF in prism form is provided between the light emitting diode LED and the light guide plate LG in order to change the direction of light for illumination from the light emitting diode. This refractive member deflects the angle θi at which light for illumination enters to the angle θo at which light for illumination goes out so that the light for illumination is changed to light for illumination oriented in the direction of the arrow L9 in FIG. 4. When such a refractive member is provided so as to correspond to each light emitting diode, it is possible to deflect the direction of light for illumination from all of the light emitting diodes aligned along the side s2.

The deflection means DF is not limited to the refractive member as in FIG. 5, and it is possible to form a deflection means by providing a reflection means that protrudes from the side s2 so that it corresponds to each light emitting diode.

Next, the liquid crystal display device according to another embodiment of the present invention is described.

Figure 6:
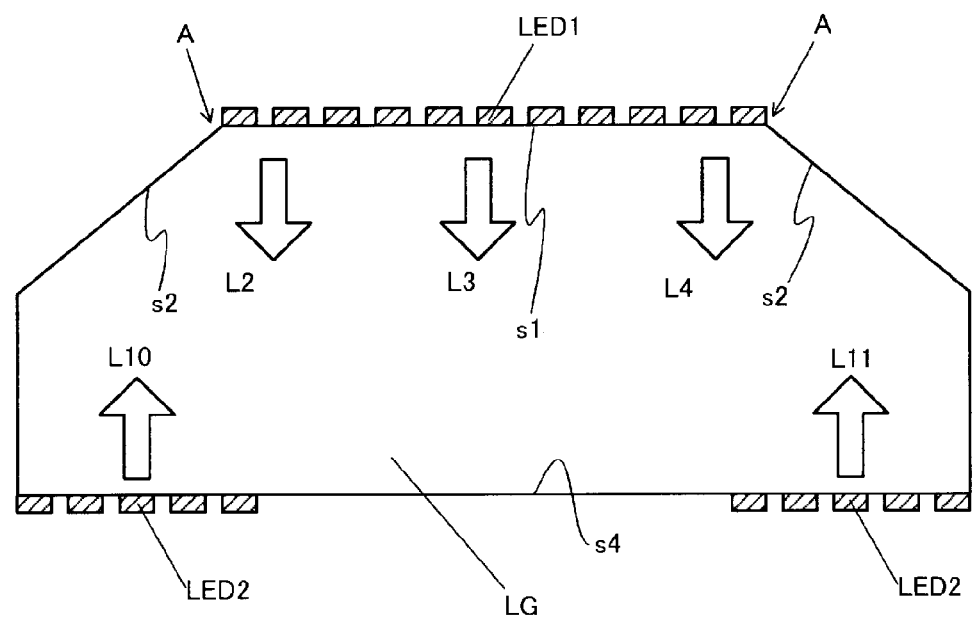
FIG. 6 is a diagram for illustrating the liquid crystal display device according to the third embodiment of the present invention.

As shown in FIG. 6, a liquid crystal display device, having a liquid crystal display panel and a backlight for illuminating the liquid crystal display panel where the outer shape of the backlight in a plane has at least one corner A of which the angle is greater than 90°, is characterized in that the liquid crystal display device has a light guide plate LG having approximately the same form as the outer shape of the above-described backlight, a number of light emitting diodes LED1 are aligned along a first side s1 of the light guide plate, the first side s1 and a second side s2 forming a corner of which the angle is greater than 90°, a number of light emitting diodes LED2 are aligned along a third side s4 that faces and is parallel to the first side s1 and are in such a location as to face the second side s2, and the main light for illumination from the light emitting diodes aligned along the above-described first and third sides propagates through the light guide plate in the directions opposite to each other (L2 to L4, L10 and L11).

As shown in FIG. 6, no light emitting diodes are aligned along the diagonal side s2 that forms the corner of which the angle is greater than 90°, and instead, light emitting diodes LED2 are provided in such a location along the lower side s4 as to correspond to the diagonal side s2. It is also possible to align all the light emitting diodes along the lower side s4. In this case, however, an IC chip for driving is provided on the liquid crystal display panel along the lower side s4, which is the longest side, and therefore, the possibility of the heat generated by the light emitting diodes affecting the operation of the IC chip is high. Therefore, light emitting diodes LED2 are provided only on the two sides (portions facing the diagonal sides s2) in FIG. 6 in order to minimize the number of light emitting diodes aligned along the lower side s4.

Here, it is possible for the light emitting diodes LED1 aligned along the upper side s1 and the light emitting diodes LED2 aligned along the lower side s4 to partially overlap in the locations as viewed in the lateral direction in the figure. As a result, the light emitting diodes LED2 aligned along the lower side s4 can compensate for the lack of the amount of light for illumination that is caused by the amount of light for illumination emitted from the two ends of the upper side s1 being smaller than that from the center portion of the upper side s1.

As shown in the first to third embodiments, the areas (length in the longitudinal direction) of the regions to be illuminated by light from the light emitting diodes aligned along the diagonal sides s3 and s2 are different from each other. Therefore, it is also possible to improve the uniformity in the brightness of the entire screen by changing the amount of light from the light emitting diodes aligned along the diagonal sides in proportion to the areas for illumination, or by changing the amount of diffusion of light through the light guide plate (or the optical sheet, such as a diffusion sheet, provided close to the light guide plate) in accordance with the regions.

In the above-described first to third embodiments, significant effects can be gained in the case where the outer shape is such that a right-angled isosceles triangle is cut off from at least one corner of the rectangular outer shape, for example. At this time, the angle of the corner of the liquid crystal display panel, the backlight and the light guide plate that is greater than 90° is approximately 135°. Here, the angle is not limited to this, and the significant effects of the present invention can be gained in the case where the angle of the corner that is greater than 90° is 100° or more and 150° or less.

As described above, the present invention can provide a liquid crystal display device where the distribution of the brightness of the backlight can be made uniform even in the case where the outer shape of the backlight in a plane has a corner of which the angle is greater than 90°.

What is claimed is:

1. A liquid crystal display device, comprising a liquid crystal display panel and a backlight for illuminating the liquid crystal display panel, wherein the backlight comprises a light guide plate, first light emitting diodes, and second light emitting diodes wherein the light guide plate has an outer shape in plan view having at least three sides and at least one corner delimiting an angle greater than 90° between two adjacent sides of the at least three sides, wherein the at least one corner consists of a first side and a second side of the light guide plate adjoining each other and delimiting the angle greater than 90° therebetween, wherein the first light emitting diodes are aligned along the first side of the light guide plate, wherein the second light emitting diodes are aligned along a third side of the light guide plate that faces and is parallel to the first side of the light guide plate and is not parallel to the second side of the light guide plate, wherein the third side of the light guide plate has a region which faces the second side of the light guide plate, wherein the second light emitting diodes are disposed at the region of the third side of the light guide plate, wherein main light for illumination of the light guide plate from the first and second light emitting diodes which are respectively aligned along the first side and the region of the third side of the light guide plate propagates through the light guide plate in directions opposite to each other, and wherein the third side has a length greater than that of any other side of the light guide plate.

2. The liquid crystal display device according to claim 1, wherein the angle that is greater than 90° in the at least one corner of the light guide plate is at least 100° and no greater than 150°.

3. The liquid crystal display device according to claim 1, wherein the liquid crystal display panel has at least one corner of which the angle is greater than 90°.

* * * * *